United States Patent [19]

Holm-Jensen

[11] Patent Number: 5,574,139
[45] Date of Patent: Nov. 12, 1996

[54] METHOD AND APPARATUS FOR THE PRODUCTION OF A WATERSOLUBLE, LOW-IRON PROTEIN PRODUCT FROM BLOOD CELL RAW MATERIAL, AND A LOW-IRON, WATERSOLUBLE PROTEIN PRODUCT PRODUCED BY HYDROLYSIS OF BLOOD CELL RAW MATERIAL

[75] Inventor: Bjarne Holm-Jensen, Hedensted, Denmark

[73] Assignee: daka a.m.b.a, Denmark

[21] Appl. No.: 336,806

[22] Filed: Nov. 9, 1994

[30] Foreign Application Priority Data

Nov. 17, 1993 [DK] Denmark ................................. 9301295

[51] Int. Cl.⁶ ........................... C07K 1/12; C07K 14/745; A23K 1/04; A61K 35/14
[52] U.S. Cl. ........................... 530/380; 530/407; 530/829; 426/635; 426/647; 426/805; 426/807
[58] Field of Search .................................. 530/380, 385, 530/400, 407, 829; 426/647, 805, 807, 635

[56] References Cited

U.S. PATENT DOCUMENTS

| | | | |
|---|---|---|---|
| 1,673,964 | 6/1928 | Atwood | 426/32 |
| 3,450,537 | 6/1969 | Filstrup | 426/456 |
| 4,152,260 | 5/1979 | Mellqvist | 210/767 |
| 4,518,525 | 5/1985 | Autio et al. | 530/385 |

FOREIGN PATENT DOCUMENTS

| | | |
|---|---|---|
| 0492555 | 7/1976 | Australia. |
| 2707688 | 8/1978 | Germany. |

*Primary Examiner*—Mindy Fleisher
*Assistant Examiner*—Nancy J. Degen

[57] ABSTRACT

The present invention relates to a method for the production of a powdered protein product from whole blood or a blood cell fraction separated from whole blood, the protein product being highly digestible, having a low content of iron and salts, being light brown, watersoluble and having good adhesive properties. The method for the production of the powdered protein product is characterized in that an aqueous blood cell material is subjected to hydrolysis at a temperature of between 140° and 190° C. and that the treated material is separated into a low-iron, liquid phase containing soluble proteins and an iron-rich, solid phase containing insoluble proteins, the liquid phase subsequently being concentrated or dried to a low-iron protein product, if desired.

23 Claims, 1 Drawing Sheet

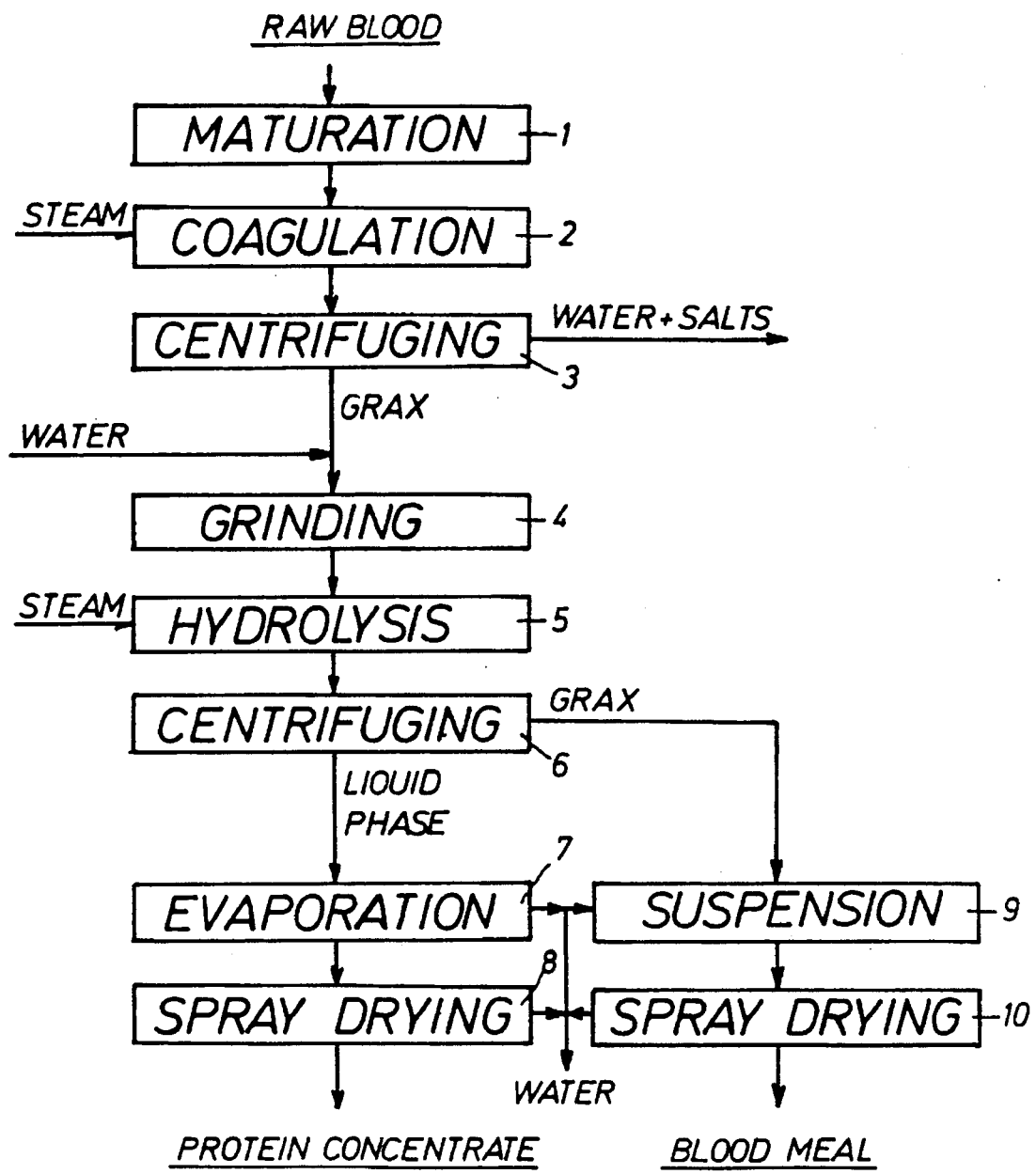

METHOD AND APPARATUS FOR THE PRODUCTION OF A WATERSOLUBLE, LOW-IRON PROTEIN PRODUCT FROM BLOOD CELL RAW MATERIAL, AND A LOW-IRON, WATERSOLUBLE PROTEIN PRODUCT PRODUCED BY HYDROLYSIS OF BLOOD CELL RAW MATERIAL

The present invention relates to a method for the production of a watersoluble, low-iron protein product from blood cell raw material. More specifically, the invention relates to a method, which makes it possible to produce a powdered protein product being highly digestible, having low contents of iron and salts, being light brown in colour, watersoluble and having good adhesive properties.

Large quantities of whole blood are each year sent by the slaughterhouses to rendering plants, where it is processed into dried blood products. These are primarily used in fodder mixtures for livestock and fish. Also, the rendering plants receive a large part of the blood cell fractions separated by the slaughterhouses in their production of blood plasma for use in foodstuffs.

There are three limiting factors when using blood products in fodder mixtures or as supplements to foodstuffs. The first is the high iron content, which in itself sets the limit for the quantity that can be used in fodder or foodstuffs; the second is the colour of blood products, which is due also to the iron content and gives the fodder or foodstuffs an often inappropriate colour; the third factor is the taste of the blood products, which particularly limits their use in foodstuffs.

Over the years, several scientists have been engaged in the removal of iron from whole blood and blood cell fractions. Thus, Hill and Holden describe a method of separating the hemo-group from hemoglobin by treating the blood with an acid acetone solution (R. Hill & H. F. Holden (1926): "Preparation and properties of the globin and oxy-haemoglobin", Biochem. J., 20, 1326). The hemoglobin denaturates in this solution and the hemo group is liberated. The globin precipitates, whereas the hemo group remains in solution in the organic phase. The phases are separated. If the process is carried out at a sufficiently low temperature, the globin can be redissolved in water and the solution is spray dried. This method has been modified over the years, and has been the most frequently used method of producing globin. From a technical point of view, the method is disadvantageous in that large quantities of highly volatile, organic solvents are used in the process, which demands major investments in process equipment, preventing evaporation of solvents to the surroundings and also ensuring no hazards of explosion.

Tybor et al. have improved the method by inclusion of a pre-processing of the blood: First the blood is extracted with chloroform and then ascorbic acid is added (P. T. Tybor, C. W. Dill & W. A. Landmann (1975): "Functional properties of proteins isolated from bovine blood by continuous pilot plant process", J. Food Sci., 40, 155). This gives globin of good emulsifying and foaming characteristics, but it makes the process considerably more expensive.

The greatest disadvantage of the acetone process, however, is the unpleasant taste of the obtained globin.

It has been known since the beginning of this century that hydrogen peroxide decolours blood (R. Droste (1915): "Concealing the use of blood in bread", Chem. Z., 39, 634 (Chem. Abstr., 9, 2782)), and the method has been the subject of many studies over the years (DE-A-744 055 (C. W. A. Borchers); V. E. Mitsyk, I. F. Osadehaya, A. M. Moroz & L. Z. Reznichenko (1975): "Quality of clarified animal blood and of food products incorporating it", Tovarovedenic, 8, 67; A. H. A. van den Oord & J. J. Wesdorp (1979): "Decolouration of slaughterhouse blood by treatment with hydrogen peroxide", Proceedings 25th European Meeting of Meat Research Workers, Budapest, Paper 10.7). The method is described as a hemolysis, which is carried out by adding water and hemoglobin solution to the blood and heating the mixture to 70° C., after which the hydrogen peroxide is added. The mixture is then cooled to 30° C. and the excess of hydrogen peroxide is removed by the addition of catalase. As a result of this treatment, the porphyrin ring of the hemo group is broken and the decoloured protein precipitates as small spheres with a diameter of between 1 and 2 μm. The decoloured protein is insoluble in water and has no functional characteristics.

In this connection reference is also made to EP-A-0 460 219, WO-A-89/00816 and FR-A-24 52 255.

Treament with acetone, as well as treatment with hydrogen peroxide are detrimental to the biological value of the obtained proteins.

Hemolysed whole blood or blood cell fractions can also be subjected to hydrolysis with proteolytic enzymes, which split the blood proteins into amino acids and short peptide chains (K. J. Stachowics, C. E. Eriksson & S. Tjelle (1977): "Enzymatic hydrolysis of ox-blood haemoglobin" in "Enzymes in Food and Beverage Processing" (ed. R. L. Ory & A. J. St. Angelo), ACS Symposium Series No. 47, p. 295; G. Drepper & K. Drepper (1979): "Verfahren zur Herstellung neuer Eiweissprodukte aus Schlachttierblut für Nahrungsmittel", Fleischwirtschaft, 59 (9), 1252; V. Hald-Christensen (1978): "Decolourisation of slaughter blood by partial enzymatic hydrolysis", Kongress-Dokumentation 24. Europäischer Fleischforscher-Kongress, Kulmbach, H:5; Hans Sejr Olsen (1983): "Herstellung neuer Proteinprodukte aus Schlachttierblut zur Verwendung in Lebensmitteln", Zeitschrift für Lebensmittel-Technologie und Verfahrenstechnik, 34 (5). The products of cleavage are watersoluble, whereas the hemo groups remain undissolved and can be separated, preferably by ultrafiltration. The yield of products of cleavage can attain up to 65% by weight, calculated on the total protein content. As these products are characterised by an unpleasant taste, it is necessary to treat them with active carbon or to deodorise them with steam.

The greatest disadvantage of this method—apart from the fact that it is uneconomic to use enzymes—is that the dried end product can contain up to 18% by weight of salts.

U.S. Pat. No. 5,089,287 describes a method for the production of a fodder supplement from slaughterhouse blood. The blood is subjected to heating, and then it is separated into a coagulate and a liquid serum. The coagulate may be sterilised in a autoclave at a pressure of 200 kPa (2 bar) for 15 to 30 minutes. It is then fed to a vessel with a mixing device for mixing with a lysing acid mixture and diatomaceous earth. The acid mixture is produced by mixing the liquid serum with an acid. The obtained product containing diatomaceous earth is mixed with other fodder supplements, if desired, and the mixture is packed. U.S. Pat. No. 3,615,651 and U.S. Pat. No. 4,219,586 describe methods for faster utilisation of slaughterhouse blood in conjunction with the production of meat-and-bone meal. The blood is fed into a container and concentrated by the introduction of steam. In order to evaporate the water, the container must be almost pressureless. The gelatinised product, which may be concentrated still further by pressing, is fed to another container, and slaughterhouse waste and bones are added. The desired meat-and-bone meal is obtained after cooking of the whole.

U.S. Pat. No. 3,450,537 describes a procedure for the continuous dewatering of blood by the production of blood meal. The blood is first pre-heated to a temperature below the coagulation temperature. The blood is then passed continuously through a steam heater, so that the blood is heated to a temperature sufficiently high to cause coagulation. The coagulated blood is then fed to a sludge centrifuge, in which the blood mass is dewatered to a dry matter content of 49% by weight. The dewatered product is then transferred to a drier, which further reduces the water content to between 5 and 10%, calculated on the weight of the blood meal.

The methods described in the above-mentioned U.S. Patents result in coloured blood products. Also, all of the iron of the blood still remains in the obtained products.

The purpose of the present invention is to provide a new method making it possible to remove the iron from a blood cell raw material, such as slaughterhouse blood, and to produce a decoloured blood protein product containing no foreign substances, or at least only small quantities of such substances. Preferably, the invention should provide a method that differs from the procedures used hitherto, in that no substances foreign to the blood are used, in that the content of salts is reduced during the process, and in that the product is sterilised during the process.

The method of the invention is characterized in that an aqueous blood cell material is subjected to hydrolysis at a temperature of between 140° and 190° C. and that the treated material is separated into a low-iron, liquid phase containing soluble proteins and an iron-rich, solid phase containing insoluble proteins, the liquid phase subsequently being concentrated or dried to a low-iron protein product, if desired.

It has shown, that hydrolysis performed according to this method on blood cell material can produce a watersoluble protein product, which contains more than 90% by weight of raw protein, less than 5% by weight of ashes and less than 0.04% by weight of iron, based on the dry matter, the amino-acid distribution of the proteins corresponding mainly to that of blood cells. This protein product is also an object of the present invention.

An embodiment of the method according to the invention is characterized in that no substances promoting the hydrolysis at the used hydrolysis temperature are added to the aqueous blood cell material to be hydrolysed or that at most less than 0.1% by weight of such substances is added, based on the dry matter. In this way it is possible to obtain a pure protein product with a low content of ashes.

In a preferred embodiment of the method according to the invention the hydrolysis is accomplished by blowing pressurized steam of a temperature above the used hydrolysis temperature into the aqueous blood cell material. This enables rapid heating of the material without the occurrence of local overheating or of problems due to burning.

In order to promote the hydrolysis of the material, the aqueous blood cell material may be subjected to grinding prior to the hydrolysis process. This gives the insoluble proteins in the material a larger surface area, and it destroys cell membranes.

The salts contained in the material are preferably removed prior to the hydrolysis process. In a preferred embodiment this is achieved by subjecting the aqueous blood cell raw material to coagulation, and by separating the coagulate from the liquid, salts containing phase, the separated coagulate subsequently being subjected to the hydrolysis process after any addition of water. In this way a significant part of the contained soluble salts can be removed from the starting material, and simultaneously, a partial dewatering of the material can be provided. The coagulate can subsequently be diluted with water to adjust the optimum water content for further processing.

The raw material is preferably coagulated by heating to avoid the addition of foreign substances. Preferably, it is heated to a temperature of between 90° and 100° C., particularly between 95° and 100° C., to bind the contained protein in an insoluble form to the greatest possible extent. In order to provide a fast and considerate heating, the heating is preferably provided by introduction of steam into the raw material.

It has shown, that a larger proportion of the contained proteins will be bound in an insoluble form during coagulation if the material is matured prior to said process. In a preferred embodiment the raw material is matured by heating to a temperature of between 20° and 50° C., preferably between 30° and 40° C., before being subjected to the coagulation process. In this way, the material can be subjected to further processing relatively quick.

Preferably, the raw material used in the method of the invention is whole blood collected in slaughterhouses or blood cell fractions separated from such whole blood. The latter fractions are normally a waste product from the separation of plasma from veterinary approved blood. The plasma is used as a supplement in a variety of foodstuffs. It is to be understood, that the protein product produced by the method of the invention can also be used as a supplement in foodstuffs if the used starting material (whole blood or whole blood fractions) has veterinary approval or is derived from veterinary approved materials. If condemned blood, or blood cell material deriving from non-approved products, is used in the process, the protein product produced by the method of the invention is used as a fodder supplement or for technical purposes. However, as the process entails sterilisation of the material, the protein product obtained can clearly also be used as a supplement in foodstuffs, provided the necessary approval can be obtained.

An especially preferred embodiment of the method of the invention comprises a number of steps ensuring a good yield of the process and resulting in a protein product that is easy to handle and has a low content of ashes. This embodiment for the production of a watersoluble, low-iron protein powder from whole blood collected in slaughterhouses, or from a whole blood fraction separated from such whole blood, comprises the following steps:

a) maturation of the whole blood or blood cell fraction at a temperature of between 20° and 50° C., preferably between 30° and 40° C., for a period of up to one hour;

b) coagulation of the blood material obtained in step a) by heating it to an increased temperature, preferably to a temperature of between 90° and 100° C.;

c) separation of the material obtained in step b) into a coagulate and a liquid, salts containing phase;

d) grinding of the coagulate obtained in step c);

e) hydrolysis under aqueous conditions of the ground coagulate obtained in step d) at a temperature of between 140° and 190° C., preferably by introduction of pressurized steam into the ground coagulate, whereby no substances promoting the hydrolysis at the used hydrolysis temperature are added to the blood cell material, neither in this stage nor the preceding stages a)–d), or at most less than 0.1% by weight of such substances is added, based on the dry matter;

f) separation of the material obtained in step e) into a low-iron, liquid phase containing soluble proteins and an iron-rich, solid phase containing insoluble proteins; and g) drying of the low-iron, liquid phase to a low-iron protein product, and grinding it to the desired protein powder, if necessary.

In the method of the invention the heat for the hydrolysis process is preferably provided by introduction of pressurized steam into the aqueous blood cell material, and the hydrolysis process is preferably carried out at a pressure of 600–800 kPa (6 and 8 bar, absolute) and at a temperature of between 160° and 170° C. for a period of between 10 and 30 minutes.

The aqueous blood cell material to be hydrolysed has preferably a dry matter content of not more than 35% by weight, preferably not more than 30% by weight, whereas the remainder is water, water being added to reduce the dry matter percentage, if desired.

The separation of the low-iron phase and the iron-rich phase after the hydrolysis process is preferably carried out by centrifuging or ultrafiltration, but other separation methods could obviously be used.

Preferably, the low-iron, liquid phase is spray dried to a protein powder. This is easy to handle and dose. If desired, the drying can be omitted to save energy costs, or a less energy consuming method of drying could be used.

To improve the percentage of insoluble proteins being hydrolysed to soluble proteins, the obtained iron-rich, solid phase containing insoluble proteins can be fed back to the hydrolysis process, so that the insoluble proteins are again subjected to the hydrolysis process one or several times. Such feedback can either be performed continuously or in batches.

The hydrolysis performed according to the method of the invention can be carried out in batches in a pressure container, or continuously in a continuous-flow reactor, as desired under the prevailing conditions and requirements.

The invention also relates to an apparatus for producing a watersoluble, low-iron protein product from blood cell raw material. The apparatus of the invention comprises:

a pressure container adapted to a pressure of between 400 and 1200 kPa (4 and 12 bar, absolute) and having a supply of pressurized steam;

a centrifuge or ultrafiltration equipment connected to the outlet of the pressure container, and a drying equipment, preferably a spray drier, connected to the outlet of the centrifuge or ultrafiltration equipment.

In a preferred embodiment the apparatus can further comprise a grinding equipment for grinding the blood cells before they are fed to the pressure container.

BRIEF DESCRIPTION OF THE DRAWINGS

The drawing shows a flow diagram of an embodiment of the method of the present invention.

DETAILED DESCRIPTION OF THE DRAWING

The invention is described in greater detail in the following with reference to the drawing, which shows a flow chart of an embodiment of the present method.

The process is carried out in an apparatus comprising a container 1 with indirect steam heating, a container 2 with direct steam heating and a feeding screw, a centrifuge 3, a grinding equipment 4, an autoclave 5 with a supply of steam, a second centrifuge 6, an evaporation equipment 7, a spray drier 8, a mixing vessel 9 and a second spray drier 10. These components of the apparatus are interconnected as shown in the flow chart.

For the sake of convenience, the quantities given below are based on the processing of 100 kg of raw blood; the quantity of blood processed is in fact between 2 and 3 t/h.

100 kgs of whole blood with a dry matter content of 16% by weight is fed into the container 1 and heated to 30°–40° C. by introduction of steam into the jacket of the container. After remaining in the container 1 for one hour, the blood is fed to container 2, where it is heated to 95°–98° C. by blowing in steam. After the blood has coagulated, it is fed to the centrifuge 3, where it is separated into a water phase and a solid phase ("grax").

The maturation process preceding the coagulation takes place at a slightly raised temperature, and has the effect of minimising the loss of protein with the water phase leaving the centrifuge, the protein content of this phase being less than 0.5% by weight in this embodiment. The major part of the salts in the whole blood (including the citrate added during sticking and blood collecting) is contained in the water phase, which is fed to a sewer after any purification.

The solid phase leaving the centrifuge consists of 15.2 kgs dry matter and 22.5 kgs water. Thus, the dry matter content is 40% by weight.

The solid phase is diluted with water to a dry material content of a maximum of 25% by weight, and then it is fed to the grinding equipment 4. The grinding serves to create the greatest possible surface area for the subsequent hydrolysis process and prevents agglomeration of the coagulated blood particles.

After grinding, the solid phase is transferred to the pressure container 5. The solid phase is heated in the container by directly blowing in pressurized steam, and it is hydrolysed at a pressure of 600–800 kPa (6–8 bar, absolute) and a temperature of 160°–170° C. for 10–30 minutes. During hydrolysis, some of the peptide bindings of the blood protein are broken, which results in short-chain, watersoluble peptides.

After the hydrolysis process, the hydrolysed blood mass (70 kgs) is fed to the centrifuge 6 or to an ultrafiltration equipment, in which the mass is separated into a liquid phase (53 kgs) containing 8.4 kgs soluble peptides, and a solid phase (17 kgs) containing 6.4 kgs non-hydrolysed protein and most of the iron content of the raw material.

The solid phase, which contains about 40% by weight of dry matter, is diluted to a solid content of about 25% by weight in the mixing vessel 9, and then it is spray dried in the spray drier 10. This yields an iron-enriched blood meal as a by-product.

The liquid phase, which contains 16% by weight of dry matter, is evaporated in the evaporation equipment 7 to a dry matter content of 35–40% by weight. The concentrate (22.4 kgs) is fed to the spray drier 8, where it is spray dried to a fine powder. 8.4 kgs of protein product is obtained corresponding to a yield of protein of 52.5% by weight, the remainder being contained in the above-mentioned blood meal.

The fine powder obtained by the spray drying has the following characteristics:

Colour: Light brown

Physical characteristics in aqueous solution: Foaming and sticking

Taste: Slightly bitter

| Analysis | |
| --- | --- |
| Raw protein: | 90% by weight |
| Raw fat: | 0.3% by weight |

-continued

Analysis

| | |
|---|---|
| Ashes: | 5% by weight |
| Iron: | 360 mgs/kg |
| Water: | 5% by weight |

Amino acids as a percentage of total protein (w/w):

| | |
|---|---|
| Cystine | 0.30% |
| Methionine | 0.94% |
| Aspargic acid | 11.16% |
| Threonine | 3.87% |
| Serine | 5.17% |
| Glutamic acid | 10.60% |
| Proline | 4.10% |
| Glycine | 5.08% |
| Alanine | 8.52% |
| Valine | 9.13% |
| Isoleucine | 1.03% |
| Leucine | 12.09% |
| Phenylalanine | 5.99% |
| Histidine | 6.24% |
| Lysine | 8.93% |
| Arginine | 3.75% |
| Tryptophan | 1.89% |

The process described above for the production of a protein concentrate can be carried out with a blood cell fraction instead.

I claim:

1. A method for the production of a watersoluble, low-iron protein product from a blood cell raw material, wherein an aqueous blood cell material is subjected to hydrolysis at a temperature of between 140° and 190° C. to form a hydrolyzed material and the hydrolyzed material is separated into a low-iron, liquid phase containing soluble proteins and an iron-rich, solid phase containing insoluble proteins, the liquid phase optionally being concentrated or dried to a low-iron protein product.

2. A method according to claim 1, wherein no substances promoting the hydrolysis at the temperature used for hydrolysis are added to the aqueous blood cell material to be hydrolysed.

3. A method according to claim 1, wherein the hydrolysis is provided by blowing pressurized steam of a temperature above the temperature used for hydrolysis into the aqueous blood cell material.

4. A method according to claim 1, wherein the aqueous blood cell material is subjected to grinding prior to the hydrolysis.

5. A method according to claim 1, wherein the aqueous blood cell raw material is subjected to coagulation, to form a coagulated material, and the material is separated into a coagulate and a liquid, salts containing phase, the coagulate subsequently being subjected to the hydrolysis.

6. A method according to claim 5, wherein the raw material is coagulated by heating to a temperature of between 90° and 100° C.

7. The method according to claim 5, wherein the raw material is coagulated by heating to a temperature of between 95° and 100°.

8. The method according to claim 5, wherein the heating is provided by introduction of steam into the raw material.

9. A method according to claim 1, wherein the raw material is matured by heating to a temperature of between 20° and 50° C. before being subjected to coagulation.

10. The method according to claim 9, wherein the temperature is between 30° and 40° C.

11. Method according to claim 1, wherein the raw material used is whole blood collected in slaughterhouses or a blood cell fraction separated from such whole blood.

12. A method according to claim 1, wherein the heating of the aqueous blood cell material to a temperature of between 140° and 190° C., is provided by introduction of pressurized steam into the aqueous blood cell material, and wherein the hydrolysis is carried out at a pressure of 600–800 kPa and at a temperature of between 160° to 170° C., for a period of between 10 and 30 minutes.

13. A method according to claim 1, wherein the aqueous blood cell material to be hydrolysed has a dry matter content of not more than 35% by weight, whereas the remainder is water.

14. A method according to claim 1, wherein the separation of low-iron phase and the iron-rich phase after the hydrolysis is carried out by centrifuging or ultrafiltration.

15. Method according to claim 1, wherein the low-iron, liquid phase is spray dried to a protein powder.

16. Method according to claim 1, wherein the iron-rich, solid phase containing insoluble proteins is fed back to the hydrolysis process.

17. Method according to claim 1, wherein the hydrolysis is carried out in batches in a pressure container, or continuously in a continuous-flow reactor.

18. A method according to claim 1, wherein less than 0.1% by weight of substances promoting the hydrolysis at the used hydrolysis temperature is added, based on the dry matter.

19. The method according to claim 1, wherein the dry matter content is not more than 30% by weight.

20. A watersoluble, low-iron protein product produced by the hydrolysis of a blood cell material, wherein the product contains more than 90% by weight of raw protein, less than 5% by weight of ashes and less than 0.04% by weight of iron, based on the dry matter, the amino-acid distribution of the raw protein corresponding mainly to that of blood cells.

21. A method for the production of a watersoluble, low-iron protein powder from whole blood collected in slaughterhouses or a blood cell fraction separated from such whole blood, comprising the following steps:

a) maturation of the whole blood or the blood cell fraction at a temperture of between 20° to 50° C. to form a blood material for a period of up to one hour;

b) coagulation of the blood material obtained in step a) by heating it to an increased temperature to form a coagulated material.

c) separation of the coagulated material obtrained in step b) into a coagulate and a liquid, salts containing phase;

d) grinding of the coagulate obtained in step c);

e) hydrolysis under aqueous conditions of the ground coagulate obtained in step d) at a temperature of between 140° and 190° C. whereby no substances promoting the hydrolysis at the temperature used for hydrolysis are added, neither in this stage nor the preceding stages a)–d);

f) separation of the hydrolysed material obtained in step e) into low-iron, liquid phase containing soluble proteins and an iron-rich, solid phase containing insoluble proteins; and g) drying of the low-iron, liquid phase to a low-iron protein product, and optionally grinding it to a protein powder.

22. The method for the production of a watersoluble, low-salts protein product from a blood cell raw material, wherein an aqueous blood cell raw material is subjected to coagulation to form a coagulated material, and the material is separated into a coagulate and a liquid, salts containing phase, the coagulate subsequently being subjected to hydrolysis at a temperature of between 140° and 190° C. to form a hydrolyzed material.

23. A watersoluble, low-salts protein product produced by hydrolysis of a blood cell material, wherein the product contains more than 90% by weight of raw protein and less than 5% by weight of ashes, based on the dry matter, the amino-acid distribution of the raw protein corresponding mainly to that of blood cells.

* * * * *